United States Patent
Tagashira et al.

(10) Patent No.: US 11,261,935 B2
(45) Date of Patent: Mar. 1, 2022

(54) PROCESS FOR MANUFACTURING A STEEL SHEET, AND STEEL BELT MADE THEREFROM

(71) Applicant: NISSHIN STEEL CO., LTD., Tokyo (JP)

(72) Inventors: Satoshi Tagashira, Hiroshima (JP); Shoichi Koutani, Hiroshima (JP); Koji Omosako, Hiroshima (JP)

(73) Assignee: NIPPON STEEL NISSHIN CO., LTD., Tokyo (JP)

(*) Notice: Subject to any disclaimer, the term of this patent is extended or adjusted under 35 U.S.C. 154(b) by 213 days.

(21) Appl. No.: 16/244,258

(22) Filed: Jan. 10, 2019

(65) Prior Publication Data
US 2019/0154111 A1 May 23, 2019

Related U.S. Application Data (62) Division of application No. 14/895,511, filed as application No. PCT/JP2014/064921 on Jun. 5, 2014, now abandoned.

(30) Foreign Application Priority Data

Jun. 5, 2013 (JP) .................................. 2013-119156

(51) Int. Cl.
*F16G 1/20* (2006.01)
*C22C 38/02* (2006.01)
(Continued)

(52) U.S. Cl.
CPC ................. *F16G 1/20* (2013.01); *B21B 1/22* (2013.01); *B21B 3/00* (2013.01); *B23K 31/02* (2013.01);
(Continued)

(58) Field of Classification Search
USPC ......................................................... 148/603
See application file for complete search history.

(56) References Cited

FOREIGN PATENT DOCUMENTS

| JP | 47-038616 | 4/1971 |
|----|-----------|--------|
| JP | 57-101615 | 6/1982 |

(Continued)

OTHER PUBLICATIONS

English language machine translation of WO 201001890 to Jang. Generated Oct. 11, 2018. (Year: 2018).*

(Continued)

*Primary Examiner* — Brian D Walck
(74) *Attorney, Agent, or Firm* — Clark & Brody LP (57) ABSTRACT

Manufacturing a steel sheet for a steel belt includes hot rolling a steel slab containing, in mass %, 0.60 to 0.80% of C, 1.0% or less of Si, 0.10 to 1.0% of Mn, 0.020% or less P, 0.010% or less S, 0.1 to 1.0% of Cr, 0 to 0.5% of V, 0 to 0.1% of Ti, 0 to 0.1% of Nb, and 0 to 0.01% of B, the balance Fe and unavoidable impurities, under a finish hot rolling temperature of 800 to 900° C. An average cooling rate from finish rolling to coiling is 20° C. per second or more. A coiling temperature is 450 to 650° C. The hot-rolled slab is cold rolled with a total rolling reduction ratio of 40% or more and a reduction ratio per one pass of less than 12%, without performing a heat treatment. The cold-rolled slab is aged at 200 to 500° C. for 0.5 to 30 hours.

8 Claims, 1 Drawing Sheet

(51) Int. Cl.
| | | |
|---|---|---|
| C22C 38/04 | (2006.01) | |
| C22C 38/24 | (2006.01) | |
| C22C 38/26 | (2006.01) | |
| C22C 38/28 | (2006.01) | |
| C21D 9/46 | (2006.01) | |
| C22C 38/00 | (2006.01) | |
| C22C 38/32 | (2006.01) | |
| C21D 8/04 | (2006.01) | |
| C21D 9/00 | (2006.01) | |
| B23K 31/02 | (2006.01) | |
| C21D 6/00 | (2006.01) | |
| C21D 8/02 | (2006.01) | |
| C22C 38/18 | (2006.01) | |
| B21B 1/22 | (2006.01) | |
| B21B 3/00 | (2006.01) | |

(52) U.S. Cl.
CPC ............ *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0247* (2013.01); *C21D 8/0436* (2013.01); *C21D 9/0068* (2013.01); *C21D 9/46* (2013.01); *C22C 38/00* (2013.01); *C22C 38/002* (2013.01); *C22C 38/02* (2013.01); *C22C 38/04* (2013.01); *C22C 38/18* (2013.01); *C22C 38/24* (2013.01); *C22C 38/26* (2013.01); *C22C 38/28* (2013.01); *C22C 38/32* (2013.01); *C21D 2211/001* (2013.01); *C21D 2211/009* (2013.01)

(56) References Cited

FOREIGN PATENT DOCUMENTS

| | | |
|---|---|---|
| JP | 2003-286542 | 10/2003 |
| JP | 2009-024233 | 2/2009 |
| JP | 2010-138488 | 6/2010 |
| JP | 2013-007084 | 1/2013 |
| WO | 2010/018920 | 2/2010 |

OTHER PUBLICATIONS

Penha et al. "Tempering of Steels." ASM Handbook, vol. 4A, Steel Heat Treating Fundamentals and Processes. pp. 327-351. (Year: 2013).*

Lahoti et al. "Flat, Bar, and Shape Rolling." ASM Handbook, vol. 14A: Metalworking: Bulk Forming. pp. 459-479 (Year: 2005 ).*

Krauss, George. "Microstructures, Processing, and Properties of Steels."ASM Handbook, vol. 1: Properties and Selection: Irons , Steels, and High-Performance Alloys. pp. 126-139 (Year: 1990).*

* cited by examiner

PROCESS FOR MANUFACTURING A STEEL SHEET, AND STEEL BELT MADE THEREFROM

This application is a Divisional of U.S. Ser. No. 14/895,511 filed on Dec. 3, 2015, which is a national phase of PCT/JP2014/064921 filed on Jun. 5, 2014.

TECHNICAL FIELD

The present invention relates to a steel sheet for a steel belt containing a carbon steel as a raw material and a process for manufacturing same, and a steel belt using the steel sheet.

BACKGROUND ART

Steel belts include a stainless steel belt made of a stainless steel as a raw material and a carbon steel belt made of a carbon steel as a raw material. The invention relates to the latter one, the carbon steel belt. Representative examples of the application of the carbon steel belt include a belt conveyor of an oven for baking cookies or the like. In the present specification, a steel belt means a carbon steel belt.

A carbon steel belt is demanded to have the following characteristics.
(i) Balance of Strength (Hardness) vs. Ductility and Toughness The steel belt is used under a suitable tension corresponding to the purpose of the conveyor, and thus is required to have such a strength that the steel belt is not deformed under the tension applied. The steel belt is also required to have such a surface hardness that handling scratches are prevented from being formed in use. In the production of a steel belt, the shape correction thereof is performed by applying tensile deformation thereto. At this time, when the strength thereof is too large, the shape correction cannot be performed due to the shortage in ductility (plastic deformability). Furthermore, suitable ductility is necessary for ensuring the toughness in use.
(ii) Fatigue Strength The belt conveyor undergoes repeated bending stress in use, and thus is required to have high fatigue strength.
(iii) Weldability A steel sheet is welded for forming into an endless belt shape. The steel belt may be sometime welded for repairing. Accordingly, the steel belt is required to have good weldability.
(iv) Flatness The representative application of the carbon steel belt is a conveyor belt of an oven as described above, and a flat shape is demanded in use thereof. The flatness is enhanced therefor by performing shape correction on producing the conveyor belt from a material coil and by applying a tension in use of the conveyor belt, and the material coil is also demanded to have excellent flatness.

Various studies have been made for measures for achieving these characteristics, and for example, a method of applying a quenching and tempering treatment and a temper rolling treatment to a medium carbon steel, a method of applying such a treatment as patenting and blueing, which has been originally utilized in the field of steel wire, to a steel sheet as described in PTL 1 and PTL 2, and the like have been developed. Most of the ordinary carbon steel belts described above are produced by one of the following processes.

(i) A hot-rolled or cold-rolled steel sheet containing approximately 0.65% of carbon is subjected to a quenching and tempering treatment.
(ii) A hot-rolled or cold-rolled steel sheet containing approximately 0.65% of carbon is subjected to patenting, cold-rolling, and blueing in this order.

CITATION LIST

Patent Literature

PTL 1: JP-A-47-38616
PTL 2: JP-A-57-101615
PTL 3: Japanese Patent No. 3964246

SUMMARY OF INVENTION

Technical Problem

The steel belts that are currently available satisfy basic performance with no practical problem for the characteristics (i) to (iv). In recent years, according to the demand of improvement of the durability (lifetime), the present applicant discloses the technique in PTL 3.

One of the factors deteriorating the durability of the steel belt is fatigue failure. The fatigue failure occurs in such a mechanism that microcracks formed from starting points, i.e., flaws at the edge surface of the belt or flaws formed in use, propagate over the surrounding area due to repeated stress. In a material where cracks are liable to propagate, i.e., a material having poor crack propagation resistance, microcracks are liable to develop to so-called fatigue cracks on receiving repeated stress. When the fatigue cracks grow to a certain size, the material is abruptly broken under repeated stress. This is fatigue failure. Accordingly, for the enhancement of the durability and the reliability of the steel belt, it is important to enhance the crack propagation resistance.

It is considered that the crack propagation resistance is largely influenced by the metallic structure of the material. It is difficult to enhance the crack propagation resistance largely and stably only by refining the metallic structure, and this is one of the factors that inhibit the progress of the technique for enhancing the durability of the steel belt. The applicant has clarified the metallic structure that is effective for the stable enhancement of the crack propagation resistance in PTL 3, by which the crack propagation resistance of a steel sheet for a steel belt has been considerably enhanced. Simultaneously, a demanding isothermal transformation treatment, such as patenting, is eliminated, and thereby a steel sheet having high crack propagation resistance can be produced by a simple process.

In the technique of PTL 3, the crack propagation resistance is enhanced by restricting the C content to 0.60% or less. However, there are cases where the C content level is demanded to be increased due to some purposes in a hypoeutectoid steel used for a steel belt. In particular, the increase of the C content is advantageous for enhancing the strength level. The invention is to provide a technique for improving the crack propagation resistance in a wide C content range of a hypoeutectoid steel. In particular, such a technique is to be provided that is effective for achieving both the further enhancement of the strength and the maintenance of the excellent crack propagation resistance in a carbon steel belt. Furthermore, such a measure is to be provided that is for producing a steel sheet for a steel belt by the aforementioned simple process without the need to add any particular step for correcting the flatness.

Solution to Problem

For achieving the aforementioned objects, the invention provides a process for manufacturing a steel sheet for a steel belt, containing: subjecting a slab of steel having a chemical composition comprising from 0.60 to 0.80% of C, 1.0% or less of Si, from 0.10 to 1.0% of Mn, 0.020% or less of P, 0.010% or less of S, from 0.1 to 1.0% of Cr, from 0 to 0.5% of V, from 0 to 0.1% of Ti, from 0 to 0.1% of Nb, and from 0 to 0.01% of B, all in terms of percentage by mass, with the balance of Fe and unavoidable impurities, to hot rolling under a condition of a finish hot rolling temperature of from 800 to 900° C., an average cooling rate from the finish rolling to coiling of 20° C. per second or more, and a coiling temperature of from 450 to 650° C.; then subjecting the hot-rolled slab to cold rolling of a total rolling reduction ratio of 40% or more and a reduction ratio per one pass of less than 12%, and preferably 10% or less, without performing a heat treatment; and then subjecting the cold-rolled slab to an aging treatment of maintaining a temperature of from 200 to 500° C. for a period of from 0.5 to 30 hours. The process may further contain a step of performing temper rolling of a rolling reduction ratio of 10% or less after the aging treatment.

In the aforementioned component elements, V, Ti, Nb and B are optional additional elements.

The rolling reduction ratio per one pass of rolling is shown by the following expression (1).

Rolling reduction ratio (%)=$(h_0-h_1)/h_0 \times 100$    (1)

wherein $h_0$ represents the sheet thickness (mm) before the pass of rolling, and $h_1$ represents the sheet thickness (mm) after the pass of rolling.

The total rolling reduction ratio is shown by the following expression (2).

Total rolling reduction ratio (%)=$(H_0-H_1)/H_0 \times 100$    (2)

wherein $H_0$ represents the sheet thickness (mm) before starting the rolling (before the first pass of rolling), and $H_1$ represents the sheet thickness (mm) after finishing the rolling (after the last pass of rolling).

The chemical composition of the steel preferably comprises more than 0.60% and 0.80% or less of C, from 0.10 to 1.00% of Si, from 0.10 to 1.00% of Mn, from 0.002 to 0.020% of P, from 0.001 to 0.010% of S, from 0.10 to 1.00% of Cr, from 0 to 0.50% of V, from 0 to 0.10% of Ti, from 0 to 0.10% of Nb, and from 0 to 0.010% of B, all in terms of percentage by mass, with the balance of Fe and unavoidable impurities. In this case, V, Ti, Nb and B are also optional additional elements. In the every pass of the cold rolling, the material temperature is preferably maintained at 110° C. or less, and more preferably 100° C. or less.

The steel sheet obtained by the production process has, for example, a metallic structure containing 70% by volume or more, and preferably 90% by volume or more, of a pearlite structure, with the balance of a pro-eutectoid ferrite phase, a tensile strength in the rolling direction of 1,100 MPa or more, and preferably 1,300 MPa or more, and a crack propagation resistance according to the following item (A) of 600 MPa or more. The amount of the pro-eutectoid ferrite is, for example, 0.1% by volume or more. Accordingly, the amount of the pearlite structure can be defined to a range of 99.9% by volume or less.

Figures 1A, 1B:
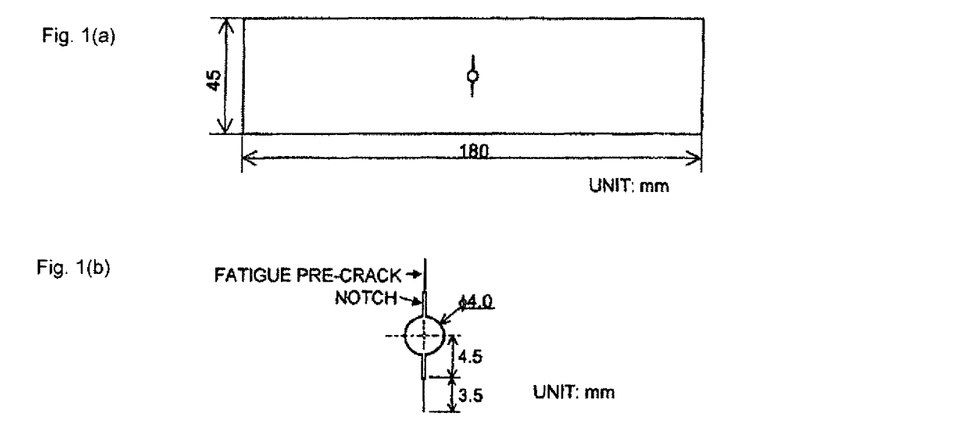
FIG. 1(a) is a plane view showing a shape of a test piece for measuring crack propagation resistance.
FIG. 1(b) is an enlarged view showing dimensions of a hole, notches and fatigue pre-cracks formed at the center of the test piece.

(A) A test piece shown in FIG. 1(a) is subjected to a tensile test in the longitudinal direction thereof (which agrees with the rolling direction) at room temperature and a tension speed of 0.3 mm/min, so as to provide a load-elongation curve, from which the maximum load is obtained, and the value obtained by dividing the maximum load by the initial cross sectional area (45 mm×thickness) is designated as the crack propagation resistance (unit: MPa).

FIG. 1(a) is a plane view showing the overall shape of the test piece. FIG. 1(b) is an enlarged view of the hole shown at the center of FIG. 1(a), which shows the hole and notches formed around the hole, and the shape and the dimension of fatigue pre-cracks. Notches each having a width of approximately 2.5 mm are formed on both sides in the width direction of the hole having a diameter of 4.0 mm at the center of the test piece, and fatigue pre-cracks having a length of 3.5±0.1 mm are formed at the ends of the notches. The fatigue pre-cracks may be formed in such a manner that after forming the notches on both sides of the hole, a partially pulsating fatigue test is performed by applying repeated load in the longitudinal direction of the test piece.

The room temperature herein means a temperature of from 10 to 35° C. as described in JIS Z2241:2011 (Tensile Test Method for Metal Materials).

The invention is also to provide a steel belt containing the steel sheet formed into an endless belt by welding. The steel belt may be favorably applied to a steel belt for a conveyor.

Advantageous Effects of Invention

According to the invention, the crack propagation resistance of a steel sheet can be stably enhanced in a C content range of a hypoeutectoid steel. In particular, both the highly enhanced strength of a tensile strength of 1,300 MPa or more and the excellent crack propagation resistance imparted can be achieved simultaneously. In the production of the steel sheet, a demanding heat treatment, such as a patenting treatment, may be eliminated, and a simple process containing hot rolling, cold rolling and aging in this order may be employed. Furthermore, the flatness of the steel sheet may be considerably enhanced by a simple operation, i.e., control of the cold rolling conditions. The steel sheet according to the invention is favorably used as a steel belt. The invention thus contributes to the enhancement of the durability and the reliability of the steel belt.

DESCRIPTION OF EMBODIMENTS

As described in PTL 3 by the present applicant, it is considered that a structure formed mainly of pearlite is practically optimum for a metallic structure that exhibits the balance of strength (hardness) vs. ductility and toughness at a high level suitable for a steel belt. According to the description of PTL 3 and studies subsequent thereto by the inventors, the following knowledge has been obtained for the structure state that is effective for the improvement of the crack propagation resistance of the steel sheet formed mainly of pearlite.

(1) In the case where a steel sheet having structure containing pro-eutectoid ferrite and pearlite is worked, the work-hardened pearlite structure has higher crack propagation resistance than the work-hardened pro-eutectoid ferrite structure. For providing a steel belt having high durability meeting the needs in recent years, the amount of the pearlite structure in the steel sheet is necessarily 70% by volume or more, and more effectively 90% by volume or more.

(2) In the cold rolling process, microcracks are introduced into the pearlite structure and may be starting points of fatigue cracks. The microcracks are formed in the cementite lamella.

(3) The microcracks are difficult to form on cold rolling when the cementite lamella in the pearlite structure is thinner. In particular, in the case where the volume fraction of the cementite in the pearlite structure is 15% or less, the cementite lamella is difficult to be cracked, and thereby the crack propagation resistance of the steel sheet is largely enhanced.

(4) In a steel sheet that is prepared for use as a steel belt, the thickness of the pro-eutectoid ferrite phase in the sheet thickness direction that is 5 µm or less is effective for providing high crack propagation resistance.

The inventors have made investigations on measures for achieving further enhancement of the strength based on the knowledge. As a result, it has been found that in a hypoeutectoid steel, the increase of the C content and the addition of Cr are significantly effective for achieving the enhancement of the strength while maintaining the high crack propagation resistance. In particular, Cr has a function of enhancing significantly the crack propagation resistance in a hypoeutectoid steel having a C content exceeding, for example 0.6% by mass. Cr may have been added for such purposes as the improvement of the quenching property and the enhancement of the strength. However, there has been no instance that the durability of a steel belt is enhanced by adding Cr to a steel having a composition that is close to the eutectoid composition having a C content exceeding, for example, 0.6% by mass.

Furthermore, the inventors have made detailed investigations on various factors that deteriorate the flatness on work-hardening a steel sheet having structure containing pro-eutectoid ferrite and pearlite by performing cold rolling. The factors determining the shape of a cold-rolled sheet often relate to various condition settings of the rolling machine. Examples of the condition settings include the diameter, the material and the profile of the mill roll, the pass schedule, and the lubricating condition. As the factors relating to the characteristics of the steel sheet, fluctuation of the material (for example, the hardness) may be considered, but as far as the hot rolling has been performed under industrially proper conditions, there may be no such fluctuation of the material inside the coil that causes deterioration of the flatness.

As a result of detailed investigations based on these factors, it has been clarified that even though the material of the hot-rolled sheet is uniform, there are cases where the flatness is deteriorated by the increase of the temperature of the coil due to heat of working on cold rolling. This may occur through the following mechanism.

(a) A higher rolling reduction ratio per one pass in cold rolling generates larger heat of working, which increases the temperature of the coil, and when the temperature of the steel sheet exceeds 110° C., dynamic strain aging occurs to increase rapidly the deformation resistance on cold rolling.

(b) The heat of working is emitted outside the system due to the heat conduction to the roll and the rolling oil, and thus the temperature increase of the center portion in the width direction of the coil is larger than that of the edge portions in the width direction thereof.

(c) In the case where the coil temperature is increased due to the large heat of working, the temperature of the center portion in the width direction firstly exceeds 110° C. to cause dynamic strain aging. Accordingly, such a state occurs that the center portion has high deformation resistance, whereas the edge portions have low deformation resistance. As a result, the deformation amount (elongation) becomes uneven in the width direction, thereby deteriorating the flatness.

(d) Accordingly, for suppressing the unevenness of the deformation resistance in the width direction, it is considerably effective that the rolling reduction ratio per one pass of cold rolling is controlled to prevent the temperature of the material in the center portion of the steel sheet in the width direction (i.e., the direction perpendicular to the rolling direction) from exceeding 110° C. It is still further effective that the temperature of the material in the center portion of the steel sheet in the width direction is controlled to 100° C. or less.

The invention has been completed based on the knowledge. The items determining the invention will be described below.

Component Elements

C is an important element for providing a metallic structure formed mainly of pearlite. Specifically, the C content largely influences the amount and the form of pearlite. When the C content is small, the volume fraction of the pearlite structure in the hot-rolled steel sheet is decreased, and it may be difficult to ensure sufficiently the amount of the pearlite structure in the steel sheet prepared for use as a steel belt. The work hardening capability on cold rolling is lowered by increasing the amount of the pro-eutectoid ferrite, which may cause a possibility that the total rolling reduction ratio in the cold rolling becomes excessive for providing the target strength level. Furthermore, the work strain of the pro-eutectoid ferrite phase may be excessive, and the amount of the pearlite structure, which is advantageous for the ductility and the toughness, may be small, resulting in decrease of the ductility and the toughness. As a result of various investigations, the C content in the invention is 0.60% by mass or more, and preferably more than 0.60% by mass.

When the C amount is increased, on the other hand, the proportion of cementite is increased in the pearlite structure. In particular, when the C content exceeds 0.80% by mass, a pro-eutectoid cementite phase is formed in the pearlite structure, which may inhibit the stable enhancement of the crack propagation resistance. Furthermore, the hardness of the welded part may be increased, and the toughness may be lowered.

Based on the aforementioned factors, the C content in the invention is necessarily controlled strictly to a range of from 0.60 to 0.80% by mass, and more preferably a range of more than 0.60% by mass and 0.80% by mass or less.

Si is effective as a deoxidizing element for molten steel. The Si content that is 0.10% by mass or more is more effective. However, when the Si content exceeds 1.00% by mass, both the hot-rolled sheet and the cold-rolled sheet may be hardened to deteriorate the productivity.

Mn has a function of refining the lamellar distance in the pearlite structure. When the Mn content is less than 0.10% by mass, the lamellar pearlite structure may not be formed, and a pseudo pearlite structure having granular cementite dispersed therein tends to be formed. In this case, excellent balance of strength (hardness) vs. ductility and toughness may not be obtained. When the Mn content exceeds 1.0% by mass, on the other hand, the toughness may be deteriorated due to the hardening of the steel sheet.

P may deteriorate the toughness of the steel sheet through the segregation thereof at the austenite grain boundaries. A P content of 0.020% by mass or less may be allowed in the invention as a range that does not cause any practical problem. The excessive dephosphorization may increase the load on steel manufacture, and thus the P content may be generally from 0.002 to 0.020% by mass.

S forms MnS in the steel and is liable to be starting points of cracks, which may cause deterioration of the fatigue characteristics. A S content of 0.010% by mass or less may be allowed in the invention as a range that does not cause any practical problem. The excessive desulfurization may increase the load on steel manufacture, and thus the S content may be generally from 0.001 to 0.010% by mass.

Cr refines the lamellar distance in the pearlite structure, and thus the addition thereof is said to be advantageous in the case where the enhancement of the strength is intended. The addition thereof may enhance the strength without deterioration of the toughness. There are cases where Cr is added for controlling the pearlite transformation characteristics (the nose position in the TTT curve). On the other hand, while the increase of the amount of C is effective for the enhancement of the strength of the hypoeutectoid steel, there is a problem that the increase of the C content may lower the crack propagation resistance. Accordingly, the C content level has been suppressed to approximately 0.6% by mass or less for the purpose where the crack propagation resistance is important. Even though Cr is added to intend to enhance the strength under such a C content level, it has been difficult to achieve the high strength of a tensile strength in the rolling direction of 1,300 MPa or more.

According to the detailed studies by the inventors, however, it has been found that in the case where the C content is increased, for example, to 0.60% by mass or more, and preferably more than 0.60% by mass, and Cr is contained in an amount of 0.10% by mass or more, the crack propagation resistance may be considerably improved while achieving the high strength of a tensile strength of 1,300 MPa or more. However, when the Cr content becomes excessive, there are cases where the crack propagation resistance is rather deteriorated. As a result of various investigations, the Cr content is necessarily limited to 1.00% by mass or less, and is preferably 0.80% by mass or less. The Cr content may be controlled to 0.60% by mass or less.

All V, Ti and Nb have a function of refining the prior austenite grain size to contribute to the enhancement of the crack propagation resistance, and thus at least one of them may be added depending on necessity. However, the effect thereof may be saturated by adding them in a large amount, and therefore the amounts thereof are preferably 0.50% by mass or less for V, 0.10% by mass or less for Ti, and 0.10% by mass or less for Nb. It is more effective to add at least one of V in an amount of from 0.05 to 0.50% by mass, Ti in an amount of from 0.001 to 0.10% by mass, and Nb in an amount of from 0.001 to 0.10% by mass.

B contributes to the enhancement of the crack propagation resistance through strengthening of the prior austenite grain boundaries, and thus may be added depending on necessity. However, the effect thereof may be saturated by adding B in a large amount, and therefore in the case where B is added, the amount thereof is preferably 0.010% by mass or less. For exhibiting the effect thereof considerably, it is more effective to add B in an amount of 0.001% by mass or more.

Metallic Structure

According to the invention, in the steel sheet prepared for use as a steel belt, the volume fraction of the pearlite structure in the metallic structure may be 70% or more, and preferably 90% or more. The balance other than pearlite is a pro-eutectoid ferrite phase. When a hot-rolled steel sheet having a metallic structure containing pearlite is cold-rolled, the lamellar distance is refined while the lamellas of the pearlite structure are oriented in the cold rolling direction. The pearlite structure is work-hardened through formation of fine lamellas aligned in the rolling direction. The fine pearlite structure having lamellas aligned in the rolling direction undergoes small decrease in toughness irrespective of the large strength thereof. Furthermore, by performing an aging treatment, the ductility and the toughness thereof are further improved while maintaining the high strength.

In the case where the amount of the pearlite structure is small, it is necessary to increase the cold rolling reduction ratio for providing the strength level required for the recent steel belt (i.e., a tensile strength in the rolling direction of 1,100 MPa, and preferably 1,300 MPa) since the amount of the pro-eutectoid ferrite phase having small work hardening capability is large. In comparison between the work-hardened pro-eutectoid ferrite phase and the work-hardened pearlite structure, the later has a larger crack propagation resistance, and therefore the small amount of pearlite is disadvantageous for the enhancement of the crack propagation resistance of the steel sheet. As a result of various investigations, for significantly enhancing the crack propagation resistance while maintaining the high strength of a tensile strength of 1,100 MPa or more, the volume fraction of the pearlite structure in the metallic structure of the steel sheet should be at least 70%. In particular, for stably providing a steel belt having a high strength level of a tensile strength in the rolling direction of, for example, 1,300 MPa or more, the volume fraction of the pearlite structure in the metallic structure of the steel sheet is preferably 90% or more. More specifically, such a metallic structure is preferred that has a pearlite structure occupying from 70 to 99.9% by volume, and preferably from 90 to 99.9% by volume, with the balance being a pro-eutectoid ferrite phase.

For enhancing the crack propagation resistance, it is considerably effective to prevent the pro-eutectoid ferrite phase, which has a relatively low strength in the metallic structure of the steel sheet, from being broken. In the steel sheet prepared for use as a steel belt, it is effective that the thickness of the pro-eutectoid ferrite phase in the sheet thickness direction is 5 μm or less. The ferrite phase is rich in ductility, but is inferior to the pearlite structure in the balance of strength vs. ductility and toughness after intense cold rolling. The pro-eutectoid ferrite phase in the hot-rolled steel sheet is extended in the rolling direction by cold rolling, and in the case where the thickness of the pro-eutectoid ferrite phase in the sheet thickness direction is 5 μm or less after cold rolling, the ductility and the toughness of the pearlite structure are not impaired largely, so as to prevent the crack propagation resistance from being deteriorated. For providing the pro-eutectoid ferrite phase having such a structure, it is effective to increase the cooling rate of the finish rolling of the hot rolling to suppress the formation amount of the pro-eutectoid ferrite phase to a low level. As a result of further investigations performed, it has been found that by adding Cr to the steel in an amount of 0.10% by mass or more, the formation amount of the pro-eutectoid ferrite is reduced, and the grain size thereof is refined, resulting in high crack propagation resistance that is capable of being sufficiently used as a steel belt even in the case where the strength thereof is enhanced by increasing the C content.

Mechanical Property

For ensuring the durability and the reliability demanded for the recent steel belt, specific examples of the mechanical property of the steel sheet used include such characteristics that the tensile strength in the rolling direction is 1,100 MPa or more, and preferably 1,300 MPa or more, at room temperature, and the crack propagation resistance according to the following item (A) is 600 MPa or more.

(A) A test piece shown in FIG. 1(a) is subjected to a tensile test in the longitudinal direction thereof (which agrees with the rolling direction) at room temperature and a tension speed of 0.3 mm/min, so as to provide a load-elongation curve, from which the maximum load is obtained, and the value obtained by dividing the maximum load by the initial cross sectional area (45 mm×thickness) is designated as the crack propagation resistance (unit: MPa).

The total elongation in the rolling direction at room temperature is preferably 5.0% or more.

The steel sheet for a steel belt having the aforementioned metallic structure and mechanical property may be produced, for example, by the following process.

Hot Rolling

In hot rolling, the cooling rate after finish hot rolling is preferably large for increasing the degree of supercooling of pearlite transformation. Specifically, in the case where a steel having the aforementioned composition is used, such a process may be preferably employed that the finish hot rolling temperature (i.e., the rolling temperature of the last pass of hot rolling) is from 800 to 900° C., and the steel is rapidly cooled to make an average cooling rate from the last pass of rolling to coiling of 20° C. per second, and then coiled at a temperature of from 450 to 650° C. The process also has an effect of suppressing the formation amount of the pro-eutectoid ferrite phase and an effect of refining the grain size thereof, as described above.

Cold Rolling

The invention has clarified the metallic structure that achieves the balance of strength vs. ductility and toughness and the durability at high levels. As a result of various investigations on the production process, the steel sheet having such a metallic structure can be produced by a process of directly cold-rolling a hot-rolled steel sheet without an isothermal transformation treatment that has been ordinarily performed. In the case where a steel belt that is required to have flatness, such as a steel belt for a conveyor, is to be produced, however, it is significantly advantageous to provide a raw material steel sheet that has high flatness. For providing a steel sheet having high flatness, it has been found that it is significantly effective to prevent the dynamic strain aging associated with the temperature increase on cold rolling, as described in the items (a) to (d) above. In the case where the surface temperature of the material in the center portion in the direction perpendicular to the rolling direction of the steel sheet (i.e., the width direction) exceeds 110° C., the dynamic strain aging is liable to occur in the center portion in the width direction, and fluctuation in characteristics occurs between the edge portions in the width direction suffering relatively small temperature increase and the center portion in the width direction, which becomes a factor of deteriorating the flatness of the cold-rolled steel sheet. It is more effective to control the surface temperature of the material in the center portion in the width direction to 100° C. or less.

In the invention, as a measure for providing a steel sheet having good flatness through decrease of the fluctuation in characteristics caused by the dynamic strain aging in cold rolling, a hot-rolled steel sheet that has not been subjected to a heat treatment after the hot rolling is subjected to cold rolling of a total rolling reduction ratio of 40% or more and a maximum reduction ratio per one pass of less than 12%. The maximum reduction ratio per one pass is more preferably 10% or less. When the reduction ratio per one pass is increased, the temperature of the steel sheet is liable to be increased, which makes difficult the prevention of the fluctuation in characteristics due to the dynamic strain aging. When the total rolling reduction ratio in cold rolling is small, a high strength is difficult to be obtained, and it is disadvantageous for the improvement of the flatness. When the total rolling reduction ratio in cold rolling is excessively large, the ductility may be lowered. The total rolling reduction ratio is preferably 75% or less in the case where the ductility is important.

Specifically, a hot-rolled steel sheet after the hot rolling may be subjected to pickling, and then directly cold-rolled in a cold rolling line. In the case where the cold rolling is performed with an in-line mill that accompanies a pickling line or the like, the total cold rolling reduction ratio until the aging treatment may be within the aforementioned range. In any one of the cases, a heat treatment may not be necessarily performed between the hot rolling and the cold rolling.

Aging Treatment

After the cold rolling, an aging treatment of maintaining a temperature of from 200 to 500° C. for a period of from 0.5 to 30 hours is performed.

Temper Rolling

Temper rolling may be performed depending on necessity. In the case where temper rolling is performed after the aging treatment, the temper rolling is preferably performed at a reduction ratio of 10% or less.

EXAMPLES

Example 1

Steels having the chemical compositions shown in Table 1 were produced, and subjected to hot rolling, cold rolling, aging treatment, and temper rolling in this order under the following conditions, so as to produce steel sheets having a thickness of 1.0 mm. The hot rolling condition is described in Table 2. The average cooling rate from the finish rolling to coiling was 10° C. per second for No. 3 in Table 2, 60° C. per second for No. 4, and 30° C. per second for the others. The thickness of the hot rolled steel sheets was in a range of from 2.0 to 5.0 mm. In the cold rolling, the hot-rolled steel sheet was pickled and then rolled to a thickness of from 1.0 to 1.1 mm. The maximum rolling reduction ratio per one pass of cold reduction was 7%, and the number of cold reduction passes was from 8 to 25. The total rolling reduction ratio of the cold rolling was 40% or more in all the specimens, and that of No. 12 in Table 2 was approximately 80%. The aging treatment was performed under conditions of 400° C. for 15 hours. The temper rolling was performed at a rolling reduction ratio of 10% or less. No. 10 in Table 2 was subjected to the cold rolling to a thickness of 1.0 mm, and the temper rolling was omitted (temper rolling reduction ratio: 0%).

TABLE 1

| Steel No. | Chemical composition (% by mass) | | | | | | | | | | Note |
|---|---|---|---|---|---|---|---|---|---|---|---|
| | C | Si | Mn | P | S | Cr | V | Ti | Nb | B | |
| A | 0.61 | 0.20 | 0.59 | 0.012 | 0.004 | 0.12 | 0 | 0 | 0 | 0 | steel of |
| B | 0.67 | 0.23 | 0.68 | 0.013 | 0.005 | 0.15 | 0 | 0 | 0 | 0 | invention |
| C | 0.78 | 0.18 | 0.65 | 0.014 | 0.005 | 0.16 | 0 | 0 | 0 | 0 | |
| E | 0.66 | 0.29 | 0.66 | 0.009 | 0.004 | 0.20 | 0.13 | 0 | 0 | 0 | |
| F | 0.64 | 0.20 | 0.98 | 0.011 | 0.004 | 0.18 | 0 | 0.02 | 0 | 0 | |
| G | 0.62 | 0.42 | 0.64 | 0.015 | 0.006 | 0.29 | 0 | 0 | 0.04 | 0 | |
| H | 0.70 | 0.38 | 0.55 | 0.012 | 0.005 | 0.51 | 0 | 0 | 0 | 0.002 | |
| I | 0.61 | 0.45 | 0.70 | 0.010 | 0.003 | 0.22 | 0 | 0.01 | 0.03 | 0 | |
| J | 0.20 | 0.21 | 0.69 | 0.015 | 0.004 | 0.16 | 0 | 0 | 0 | 0 | steel for |
| K | 0.68 | 0.20 | 0.60 | 0.015 | 0.004 | 0.04 | 0 | 0 | 0 | 0 | comparison |

The underlined values are outside the scope of the invention.

The resulting steel sheets having a thickness of 1.0 mm were subjected to observation of the metallic structure and mechanical tests in the following manners.

Observation of Pearlite Structure

A cross sectional surface of the steel sheet including the rolling direction and the sheet thickness direction was electrochemically polished and then etched to prepare a specimen. An image of the surface of the specimen was obtained with an optical microscope, from which the volume fraction of the pearlite structure was obtained by image analysis.

Observation of Pro-eutectoid Ferrite Phase

For the same specimen as above, 10 pro-eutectoid ferrite phases extending in the rolling direction were measured for the maximum thickness in the sheet thickness direction, and the average value thereof was designated as the thickness in the sheet thickness direction of the pro-eutectoid ferrite phase.

Hardness Test

A cross sectional surface of the steel sheet including the rolling direction and the sheet thickness direction was measured for Vickers hardness. A steel sheet for a steel belt used as a conveyor is demanded to have a hardness level of 310 HV or more, and preferably 380 HV or more.

Tensile Test

A tensile test piece according to JIS No. 5 in parallel to the rolling direction was used and subjected to a tensile test at room temperature and a tension speed of 10 mm/min. A steel sheet for a steel belt used as a conveyor is demanded to have characteristics of a tensile strength of 1,100 MPa or more and a total elongation of 5% or more, and in particular, the tensile strength is preferably 1,300 MPa or more.

Measurement Test of Crack Propagation Resistance

The crack propagation resistance was measured by using a test piece shown in FIG. 1(a) according to the process defined in the item (A). A test piece exhibiting a value of 600 MPa was designated as good. The results are shown in Table 2.

TABLE 2

| No. | Steel No. | Hot rolling condition | | Metallic structure | | Mechanical properties | | | | Note |
|---|---|---|---|---|---|---|---|---|---|---|
| | | Finish hot rolling temperature (° C.) | Coiling temperature (° C.) | Volume fraction of pearlite structure (%) | Thickness in sheet thickness direction of pro-eutectoid ferrite phase (μm) | Hardness (HV) | Crack propagation resistance (MPa) | Tensile strength (MPa) | Total elongation (%) | |
| 1 | A | 855 | 530 | 95 | 0.5 | 428 | 660 | 1,310 | 9.0 | invention |
| 2 | B | 850 | 583 | 99 | 0.1 | 435 | 652 | 1,379 | 8.0 | invention |
| 3 | B | 848 | 580 | 67 | 6.2 | 400 | 584 | 1,262 | 7.2 | comparison |
| 4 | B | 856 | 588 | 0 | 0.3 | 466 | 545 | 1,487 | 4.2 | comparison |
| 5 | C | 842 | 550 | 96 | 1.0 | 458 | 618 | 1,435 | 6.2 | invention |
| 7 | E | 858 | 545 | 97 | 0.2 | 438 | 721 | 1,382 | 7.7 | invention |
| 8 | F | 845 | 540 | 97 | 0.1 | 439 | 738 | 1,384 | 7.6 | invention |
| 9 | G | 840 | 540 | 96 | 0.2 | 437 | 740 | 1,387 | 7.5 | invention |
| 10 | H | 864 | 543 | 95 | 0.2 | 436 | 735 | 1,380 | 7.8 | invention |
| 11 | I | 860 | 548 | 95 | 0.1 | 440 | 742 | 1,385 | 7.6 | invention |
| 12 | J | 851 | 585 | 30 | 5.8 | 351 | 580 | 1,050 | 4.2 | comparison |
| 13 | K | 848 | 580 | 99 | <0.1 | 430 | 467 | 1,160 | 2.6 | comparison |

Nos. 1, 2, 5 and 7 to 11 having the composition and the metallic structure defined in the invention had high strength of a tensile strength of 1,300 MPa or more and durability of a crack propagation resistance of 600 MPa or more, and thus were confirmed to have excellent durability as a steel belt. These were also good in hardness and total elongation.

On the other hand, No. 3 suffered formation of a large amount of the pro-eutectoid ferrite phase due to the small cooling rate after the finish hot rolling of 10° C. per second, and the crack propagation resistance thereof was small although the tensile strength and the elongation thereof were good. No. 4 had a small crack propagation resistance since the hot-rolled structure was a structure formed mainly of bainite. No. 12 suffered formation of a large amount of the pro-eutectoid ferrite phase in the metallic structure due to the small C content of the steel, and the tensile strength thereof was only 1,050 MPa even with the cold rolling reduction ratio increased to approximately 80%. Furthermore, the total elongation was small due to the high cold rolling reduction ratio. No. 13 had a small crack propagation resistance due to the small C content.

Example 2

The steel B in Table 1 was subjected to hot rolling at a finish hot rolling temperature of 850° C. and a coiling temperature of 570° C. to produce a steel sheet having a thickness of 2.5 mm. The average cooling rate from the finish rolling to the coiling was 35° C. per second. The steel sheet was cold-rolled to a thickness of 1.0 mm by one of the following two cold rolling processes.
(A) rolling speed: 200 m/min, number of rolling passes: 15, reduction ratio per one pass:up to 7%, total rolling reduction ratio: 60% (invention)
(B) rolling speed: 200 m/min, number of rolling passes: 9, reduction ratio per one pass:up to 13%, total rolling reduction ratio: 60% (comparison)

On performing the cold rolling under the condition (A) or (B), the surface temperature of the coil was measured on every pass. The measured positions were the center portion in the width direction and the position 50 mm away from the edge, in the center portion in the longitudinal direction of the coil. The flatness of the cold-rolled steel sheet having a thickness of 1.0 mm after rolling was measured at the center portion and the edge portion. The flatness was evaluated in such a manner that a length of 2,000 mm in the longitudinal direction of the coil was designated as the reference length, and the height of protrusions within the reference length was measured. The results are shown in Table 3.

TABLE 3

| No. | Steel No. | Cold rolling condition | Coil temperature (° C.) Edge portion | Coil temperature (° C.) Center portion | Flatness (mm) Edge portion | Flatness (mm) Center portion |
|---|---|---|---|---|---|---|
| 14 | B | (A) | 75 | 86 | 15 | 7 |
| 15 | B | (B) | 94 | 122 | 54 | 32 |

In No. 14 with the cold rolling condition (A) within the scope of the invention, the surface temperature of the coil did not reach 90° C. during the 15 passes of cold rolling performed. The flatness after the cold rolling was a favorable value. In No. 15 with the cold rolling condition (B) outside the scope of the invention, on the other hand, the surface temperature of the coil at the center portion reached 122° C. at maximum during the cold rolling, but the temperature at the edge portion at this time was 94° C. No. 15 exhibited a larger value (mm) for flatness after the cold rolling than No. 14, and thus was apparently inferior in flatness. It is considered that in No. 15, the temperature becomes 110° C. or more only in the center portion in the coil width direction to increase the deformation resistance, and thus the flatness of the coil is deteriorated.

The invention claimed is:

1. A process for manufacturing a cold rolled and aged steel sheet for a steel belt, comprising: subjecting a slab of steel having a chemical composition containing from 0.60 to 0.80% of C, 1.0% or less of Si, from 0.10 to 1.0% of Mn, 0.020% or less of P, 0.010% or less of S, from 0.1 to 1.0% of Cr, from 0 to 0.5% of V, from 0 to 0.1% of Ti, from 0 to 0.1% of Nb, and from 0 to 0.01% of B, all in terms of percentage by mass, with the balance of Fe and unavoidable impurities, to hot rolling under a condition of a finish hot rolling temperature of from 800 to 900° C., an average cooling rate from the finish rolling to coiling of 20° C. per second or more, and a coiling temperature of from 450 to 650° C.; then subjecting the hot-rolled slab to cold rolling of a total rolling reduction ratio of 40% or more and a reduction ratio per one pass of less than 12%, without performing a heat treatment to make a cold-rolled steel sheet; and then subjecting the cold-rolled steel sheet to an aging treatment of maintaining a temperature of from 200 to 500° C. for a period of from 0.5 to 30 hours.

2. The process for manufacturing a cold rolled and aged steel sheet for a steel belt according to claim 1, wherein in the cold rolling, the reduction ratio per one pass is 10% or less, and the total rolling reduction ratio is 40% or more.

3. The process for manufacturing a cold rolled and aged steel sheet for a steel belt according to claim 1, wherein in every pass of the cold rolling, a material temperature of the cold rolled steel sheet is maintained at 110° C. or less.

4. The process for manufacturing a cold rolled, aged, and temper rolled steel sheet for a steel belt according to claim 1, wherein the process further comprises performing temper rolling of a rolling reduction ratio of 10% or less after the aging treatment.

5. The process for manufacturing a cold rolled and aged steel sheet for a steel belt according to claim 1, wherein in cold rolling, a temperature of a center portion of the cold rolled steel sheet in a width direction is maintained to 110° C. or less.

6. A process for manufacturing a cold rolled and aged steel sheet for a steel belt, comprising: subjecting a slab of steel having a chemical composition containing from 0.60 to 0.80% of C, 1.0% or less of Si, from 0.10 to 1.0% of Mn, 0.020% or less of P, 0.010% or less of S, from 0.1 to 1.0% of Cr, from 0 to 0.5% of V, from 0 to 0.1% of Ti, from 0 to 0.1% of Nb, and from 0 to 0.01% of B, all in terms of percentage by mass, with the balance of Fe and unavoidable impurities, to hot rolling under a condition of a finish hot rolling temperature of from 800 to 900° C., an average cooling rate from the finish rolling to coiling of 20° C. per second or more, and a coiling temperature of from 450 to 650° C.; then subjecting the hot-rolled slab to cold rolling of a total rolling reduction ratio of 40% or more and a reduction ratio per one pass of less than 12%, without performing a heat treatment to make a cold-rolled steel sheet; and then subjecting the cold-rolled steel sheet to an aging treatment of maintaining a temperature of from 200 to 500° C. for a period of from 0.5 to 30 hours, thereby producing a steel sheet having a volume fraction of a pearlite structure in a metallic structure of 70% or more, a tensile strength in the rolling direction of 1,100 MPa or more, and a crack propagation resistance according to the following item (A) of 600 MPa or more:
(A) a test piece, which has a hole having a diameter of 4.0 mm at the center of the test piece and two notches each having a width of approximately 2.5 mm formed on both sides in a width direction of the hole, is subjected to a tensile test in the longitudinal direction thereof (which agrees with the rolling direction) at room temperature and a tension speed of 0.3 mm/min, so as to provide a load-elongation curve, from which a maximum load is obtained, and a value obtained by dividing the maximum load by an initial cross sectional area (45 mm×thickness) is designated as the crack propagation resistance (unit: MPa).

7. A process for manufacturing a cold rolled and aged steel sheet for a steel belt, comprising: subjecting a slab of steel having a chemical composition containing more than 0.60% and 0.80% or less of C, from 0.10 to 1.00% of Si, from 0.10 to 1.00% of Mn, from 0.002 to 0.020% of P, from 0.001 to 0.010% of S, from 0.10 to 1.00% of Cr, from 0 to 0.50% of V, from 0 to 0.10% of Ti, from 0 to 0.10% of Nb, and from 0 to 0.010% of B, all in terms of percentage by mass, with the balance of Fe and unavoidable impurities, to hot rolling under a condition of a finish hot rolling temperature of from 800 to 900° C., an average cooling rate from the finish rolling to coiling of 25° C. per second or more, and a coiling temperature of from 450 to 650° C.; then subjecting the hot-rolled slab to cold rolling of a total rolling reduction ratio of 40% or more and a reduction ratio per one pass of less than 12%, without performing a heat treatment to make a cold-rolled steel sheet; and then subjecting the cold-rolled steel sheet to an aging treatment of maintaining a temperature of from 200 to 500° C. for a period of from 0.5 to 30 hours.

8. A process for manufacturing a cold rolled and aged steel sheet for a steel belt, comprising: subjecting a slab of steel having a chemical composition containing more than 0.60% and 0.80% or less of C, from 0.10 to 1.00% of Si, from 0.10 to 1.00% of Mn, from 0.002 to 0.020% of P, from 0.001 to 0.010% of S, from 0.10 to 1.00% of Cr, from 0 to 0.50% of V, from 0 to 0.10% of Ti, from 0 to 0.10% of Nb, and from 0 to 0.010% of B, all in terms of percentage by mass, with the balance of Fe and unavoidable impurities, to hot rolling under a condition of a finish hot rolling temperature of from 800 to 900° C., an average cooling rate from the finish rolling to coiling of 25° C. per second or more, and a coiling temperature of from 450 to 650° C.; then subjecting the hot-rolled slab to cold rolling of a total rolling reduction ratio of 40% or more and a reduction ratio per one pass of less than 12%, without performing a heat treatment to make a cold-rolled steel sheet; and then subjecting the cold-rolled steel sheet slab to an aging treatment of maintaining a temperature of from 200 to 500° C. for a period of from 0.5 to 30 hours, thereby producing a steel sheet having a volume fraction of a pearlite structure in a metallic structure of 90% or more, a tensile strength in the rolling direction of 1,300 MPa or more, and a crack propagation resistance according to the following item (A) of 600 MPa or more:

(A) a test piece, which has a hole having a diameter of 4.0 mm at the center of the test piece and two notches each having a width of approximately 2.5 mm formed on both sides in a width direction of the hole, is subjected to a tensile test in the longitudinal direction thereof (which agrees with the rolling direction) at room temperature and a tension speed of 0.3 mm/min, so as to provide a load-elongation curve, from which a maximum load is obtained, and a value obtained by dividing the maximum load by an initial cross sectional area (45 mm×thickness) is designated as the crack propagation resistance (unit: MPa).

* * * * *